US012300183B2

(12) United States Patent
Chen et al.

(10) Patent No.: US 12,300,183 B2
(45) Date of Patent: May 13, 2025

(54) FOVEATED DISPLAY

(71) Applicant: Apple Inc., Cupertino, CA (US)

(72) Inventors: Cheng Chen, San Jose, CA (US); Jason C. Sauers, Sunnyvale, CA (US); Fletcher R. Rothkopf, Los Altos, CA (US); David W. Lum, Cupertino, CA (US); Chun-Yao Huang, San Jose, CA (US); Enkhamgalan Dorjgotov, Sunnyvale, CA (US); Graham B. Myhre, Campbell, CA (US); Bennett S. Wilburn, Saratoga, CA (US); Paolo Sacchetto, Cupertino, CA (US); Shih Chang Chang, Cupertino, CA (US); Wonjae Choi, San Jose, CA (US); Cheuk Chi Lo, Belmont, CA (US)

( * ) Notice: Subject to any disclaimer, the term of this patent is extended or adjusted under 35 U.S.C. 154(b) by 0 days.

(21) Appl. No.: 18/479,397

(22) Filed: Oct. 2, 2023

(65) Prior Publication Data

US 2024/0029661 A1 Jan. 25, 2024

Related U.S. Application Data

(60) Division of application No. 17/150,818, filed on Jan. 15, 2021, now Pat. No. 11,810,516, which is a
(Continued)

(51) Int. Cl.

*G09G 3/3275* (2016.01)
*G09G 3/20* (2006.01)
(Continued)

(52) U.S. Cl.

CPC ............. *G09G 3/3266* (2013.01); *G09G 3/20* (2013.01); *G09G 3/3225* (2013.01);
(Continued)

(58) Field of Classification Search
None
See application file for complete search history.

(56) References Cited

U.S. PATENT DOCUMENTS 5,808,589 A 9/1998 Fergason
6,417,868 B1 7/2002 Bock et al.
(Continued)

FOREIGN PATENT DOCUMENTS

CN 1551608 A 12/2004
CN 1622179 A 6/2005
(Continued)

OTHER PUBLICATIONS

Bennett, Omnifocal Glasses Could Focus on Whatever You're Looking At Automatically, Mar. 11, 2016, 11 pages, Popular Mechanics [online], Retrieved from the Internet: <URL: https://www.popularmechanics.com/technology/a19885/smart-glasses-focus-any-distance/>.

(Continued)

*Primary Examiner* — Parul H Gupta
(74) *Attorney, Agent, or Firm* — Treyz Law Group, P.C.; G. Victor Treyz; Jinie M. Guihan

(57) ABSTRACT

An electronic device such as a head-mounted device may have displays. The display may have regions of lower and higher resolution to reduce data bandwidth and power consumption for the display while preserving satisfactory image quality. Data lines may be shared by lower and higher resolution portions of a display or different portions of a display with different resolutions may be supplied with different numbers of data lines. Data line length may be varied in transition regions between lower resolution and higher resolution portions of a display to reduce visible discontinuities between the lower and higher resolution portions. The lower and higher resolution portions of the display may be dynamically adjusted using dynamically
(Continued)

adjustable gate driver circuitry and dynamically adjustable data line driver circuitry.

15 Claims, 16 Drawing Sheets

Related U.S. Application Data continuation of application No. 16/323,751, filed as application No. PCT/US2017/046761 on Aug. 14, 2017, now Pat. No. 10,930,219.

(60) Provisional application No. 62/375,201, filed on Aug. 15, 2016.

(51) Int. Cl.
*G09G 3/3225* (2016.01)
*G09G 3/3266* (2016.01)
*G09G 3/36* (2006.01)

(52) U.S. Cl.
CPC ......... *G09G 3/3275* (2013.01); *G09G 3/3677* (2013.01); *G09G 3/3688* (2013.01); *G09G 2300/0426* (2013.01); *G09G 2300/0452* (2013.01); *G09G 2310/0205* (2013.01); *G09G 2310/0218* (2013.01); *G09G 2310/0221* (2013.01); *G09G 2310/0267* (2013.01); *G09G 2310/027* (2013.01); *G09G 2310/0286* (2013.01); *G09G 2310/0297* (2013.01); *G09G 2310/08* (2013.01); *G09G 2330/021* (2013.01); *G09G 2340/0407* (2013.01)

(56) References Cited

U.S. PATENT DOCUMENTS

| | | | |
|---|---|---|---|
| 8,467,133 | B2 | 6/2013 | Miller |
| 9,057,826 | B2 | 6/2015 | Gupta et al. |
| 9,298,012 | B2 | 3/2016 | Bohn et al. |
| 9,345,402 | B2 | 5/2016 | Gao |
| 2002/0019819 | A1 | 2/2002 | Sekiguchi et al. |
| 2003/0184561 | A1 | 10/2003 | Vorst |
| 2004/0130520 | A1 | 7/2004 | Maeda et al. |
| 2004/0212844 | A1* | 10/2004 | Kato ...................... H04N 25/76 358/448 |
| 2004/0227703 | A1 | 11/2004 | Lamvik et al. |
| 2005/0116918 | A1 | 6/2005 | Shin |
| 2005/0128170 | A1 | 6/2005 | Kang et al. |
| 2006/0022908 | A1 | 2/2006 | Schwanenberger et al. |
| 2011/0221656 | A1 | 9/2011 | Haddick et al. |
| 2012/0105310 | A1 | 5/2012 | Sverdrup et al. |
| 2012/0113092 | A1 | 5/2012 | Bar-Zeev et al. |
| 2013/0070109 | A1* | 3/2013 | Gove ................... H04N 25/702 348/207.1 |
| 2013/0140465 | A1* | 6/2013 | Nishinou ............... G03B 42/02 250/366 |
| 2013/0187904 | A1 | 7/2013 | DeCusatis |
| 2014/0146394 | A1 | 5/2014 | Tout et al. |
| 2014/0247277 | A1 | 9/2014 | Guenter et al. |
| 2015/0277151 | A1 | 10/2015 | Yadin et al. |
| 2016/0018657 | A1 | 1/2016 | Hong et al. |
| 2016/0171938 | A1 | 6/2016 | Na et al. |
| 2016/0191910 | A1 | 6/2016 | von und zu Liechtenstein |
| 2016/0267716 | A1 | 9/2016 | Patel |
| 2016/0379606 | A1 | 12/2016 | Kollin et al. |
| 2017/0038590 | A1 | 2/2017 | Jepsen |
| 2017/0160440 | A1 | 6/2017 | Yadin et al. |
| 2017/0171533 | A1 | 6/2017 | Benitez et al. |
| 2017/0236466 | A1 | 8/2017 | Spitzer et al. |
| 2017/0256194 | A1* | 9/2017 | Kim ..................... G09G 3/2092 |
| 2017/0296421 | A1 | 10/2017 | Travers et al. |
| 2020/0393680 | A1* | 12/2020 | Högstedt ................... G01J 5/04 |

FOREIGN PATENT DOCUMENTS

| | | | |
|---|---|---|---|
| CN | 1901024 | A | 1/2007 |
| CN | 101990070 | A | 3/2011 |
| CN | 102576517 | A | 7/2012 |
| CN | 105074808 | A | 11/2015 |
| CN | 105261325 | A | 1/2016 |
| JP | 2003330430 | A | 11/2003 |
| JP | 2006301166 | A | 11/2006 |
| JP | 2013126095 | A | 6/2013 |
| KR | 20040090128 | A | 10/2004 |
| KR | 20050054520 | A | 6/2005 |
| KR | 20160072857 | A | 6/2016 |
| TW | 200426769 | A | 12/2004 |

OTHER PUBLICATIONS

Nagai et al., 10.2: High-Resolution High-Brightness LCD Projectors, SID International Symposium, May 17, 1998.

Chen et al., Overview of Head Mounted Display Technology and Applications, Proceeding, IDW '99, Jan. 1999, pp. 319-322, International Display Workshops General Incorporated Association.

* cited by examiner

100

| SGRP | Grouping Function |
|---|---|
| 00 | by 1 |
| 01 | by 2 |
| 10 | by 4 |

FOVEATED DISPLAY

This application is a division of non-provisional patent application Ser. No. 17/150,818, filed Jan. 15, 2021, which is a continuation of non-provisional patent application Ser. No. 16/323,751, filed Feb. 6, 2019, now U.S. Pat. No. 10,930,219, issued Feb. 23, 2021, which is a 371 of PCT/US2017/046761, filed Aug. 14, 2017, which claims the benefit of provisional patent application No. 62/375,201, filed Aug. 15, 2016, which are hereby incorporated by reference herein in their entireties.

BACKGROUND

This relates generally to displays, and, more particularly, to displaying content on displays with different resolutions in different display areas.

Electronic devices may include displays. For example, head-mounted devices may have displays for displaying images for a user. It can be challenging to display images on a display in a head-mounted device. High-resolution images are visually attractive, but may be difficult or impossible to present to a user without using large amounts of image data bandwidth and consuming large amounts of power.

SUMMARY

An electronic device such as a head-mounted device may have displays that are viewable by the eyes of a viewer through lenses. The display may have regions of lower and higher resolution to reduce data bandwidth and power consumption for the display while preserving satisfactory image quality.

In some configurations, the lower and higher resolution portions of the display may be dynamically adjustable using dynamically adjustable gate driver circuitry and dynamically adjustable data line driver circuitry. Data lines may be shared by lower and higher resolution portions of a display or different portions of a display that have different resolutions may be supplied with different numbers of data lines. In this type of arrangement, data line length and pixel size may be varied in transition regions between the lower resolution and higher resolution portions of a display to reduce visible discontinuities between the lower and higher resolution portions.

DETAILED DESCRIPTION

Figure 1:
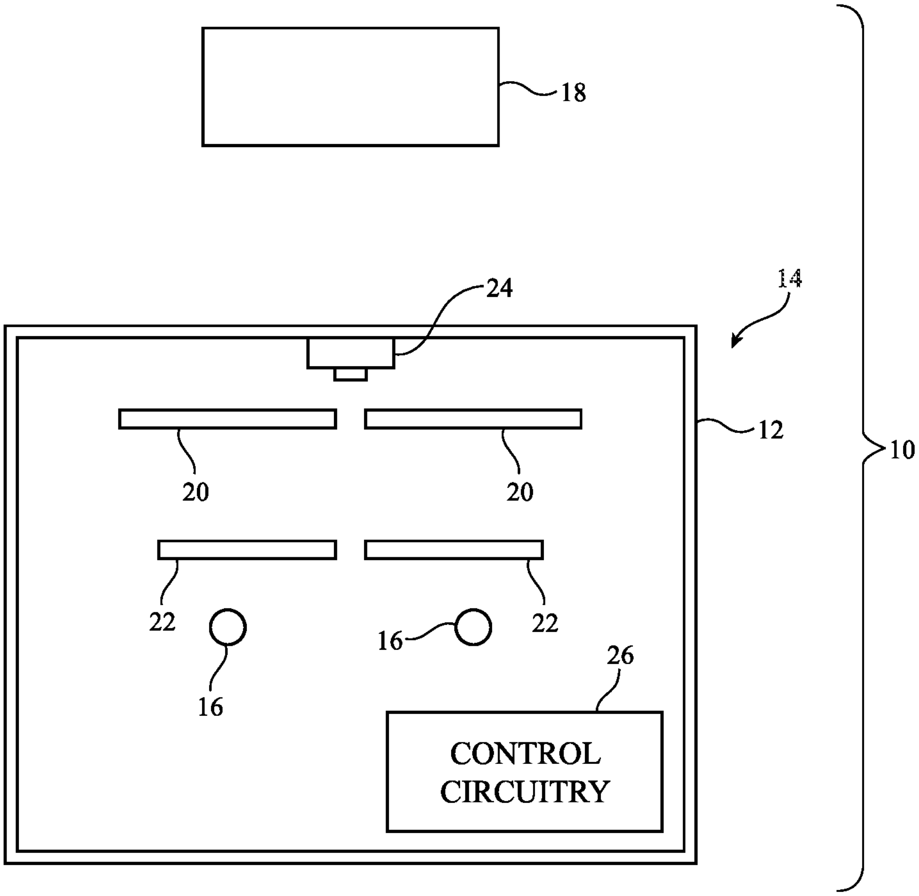
FIG. 1 is a diagram of an illustrative electronic device with a display in accordance with an embodiment.

An illustrative system that may be used to display images in different areas of a display with different resolutions is shown in FIG. 1. System 10 may include a portable electronic device such as portable electronic device 14. Device 14 may be a head-mounted device such as head-mounted display. Device 14 may include one or more displays such as displays 20 mounted in a support structure such as support structure 12. Displays 20 may sometimes be referred to as display modules or display units. Structure 12 may have the shape of a pair of eyeglasses (e.g., supporting frames), may form a housing having a helmet shape, may form a pair of goggles, or may have other configurations to help in mounting and securing the components of device 14 on the head of a user.

Displays 20 may be liquid crystal displays, organic light-emitting diode displays, or displays of other types. Optical system components such as lenses 22 may allow a viewer (see, e.g., viewer eyes 16) to view images on display(s) 20.

There may be two lenses 22 associated with respective left and right eyes 16. Each lens 22 may include one or more lens elements (as an example) through which light from pixel arrays in displays 20 passes. A single display 20 may produce images for both eyes 16 or, as shown in the example of FIG. 1, a pair of displays 20 may be used to display images. As an example, displays 20 may include a left display aligned with a left lens 22 and a viewer's left eye and may include a right display aligned with a right lens 22 and a viewer's right eye. In configurations with multiple displays, the focal length and positions of lenses 22 may be selected so that any gap present between the displays will not be visible to a user (i.e., so that the images of the left and right displays overlap seamlessly).

In configurations in which device 14 is a pair of virtual reality glasses, displays 20 may obscure the viewer's view of the viewer's surrounding environment. In configurations in which device 14 is a pair of augmented reality glasses, displays 20 may be transparent and/or display 14 may be provided with optical mixers such as half-silvered mirrors to allow viewer 16 to simultaneously view images on displays 20 and external objects such as object 18 in the surrounding environment.

Device 14 may include control circuitry 26. Control circuitry 26 may include processing circuitry such as microprocessors, digital signal processors, microcontrollers, baseband processors, image processors, application-specific integrated circuits with processing circuitry, and/or other processing circuitry and may include random-access memory, read-only memory, flash storage, hard disk storage, and/or other storage (e.g., a non-transitory storage media for storing computer instructions for software that runs on control circuitry 26).

Device 14 may include input-output circuitry such as touch sensors, buttons, microphones to gather voice input and other input, sensors, and other devices that gather input (e.g., user input from viewer 16) and may include light-emitting diodes, display(s) 20, speakers, and other devices for providing output (e.g., output for viewer 16). Device 14 may, if desired, include wireless circuitry and/or other circuitry to support communications with a computer or other external equipment (e.g., a computer that supplies display 14 with image content). If desired, sensors such as an accelerometer, compass, an ambient light sensor or other light detector, a proximity sensor, a scanning laser system, and other sensors may be used in gathering input during operation of display 14. These sensors may include a digital image sensor such as camera 24. Cameras such as camera 24 may gather images of the environment surrounding viewer 16 and/or may be used to monitor viewer 16. As an example, camera 24 may be used by control circuitry 26 to gather images of the pupils and other portions of the eyes of the viewer. The locations of the viewer's pupils and the locations of the viewer's pupils relative to the rest of the viewer's eyes may be used to determine the locations of the centers of the viewer's eyes (i.e., the centers of the user's pupils) and the direction of view (gaze direction) of the viewer's eyes.

During operation, control circuitry 26 may supply image content to displays 20. The content may be remotely received (e.g., from a computer or other content source coupled to display 14) and/or may be generated by control circuitry 26 (e.g., text, other computer-generated content, etc.). The content that is supplied to displays 20 by control circuitry 26 may be viewed by viewer 16.

Viewers are most sensitive to image detail in the main field of view. Peripheral regions of a display may therefore be provided with less image detail than the portion of the display in the direction of the viewer's gaze. By including lower resolution areas in a display, image processing burdens such as burdens imposed by image data bandwidth usage and power consumption can be minimized. If desired, display resolution may be reduced in all peripheral portions of displays 20 (e.g., portions of displays 20 near the edges of displays 20). If desired, displays 20 may be provided with dynamically adjustable resolutions. In displays with dynamically reconfigurable display resolution, gaze detection techniques (e.g., using camera 24) may be used in determining which portion of the dynamically reconfigurable display is being directly viewed by viewer 16 and therefore should have the highest resolution and in determining which portions of the dynamically reconfigurable display is in the viewer's peripheral vision and should have lower resolution.

Figure 2:
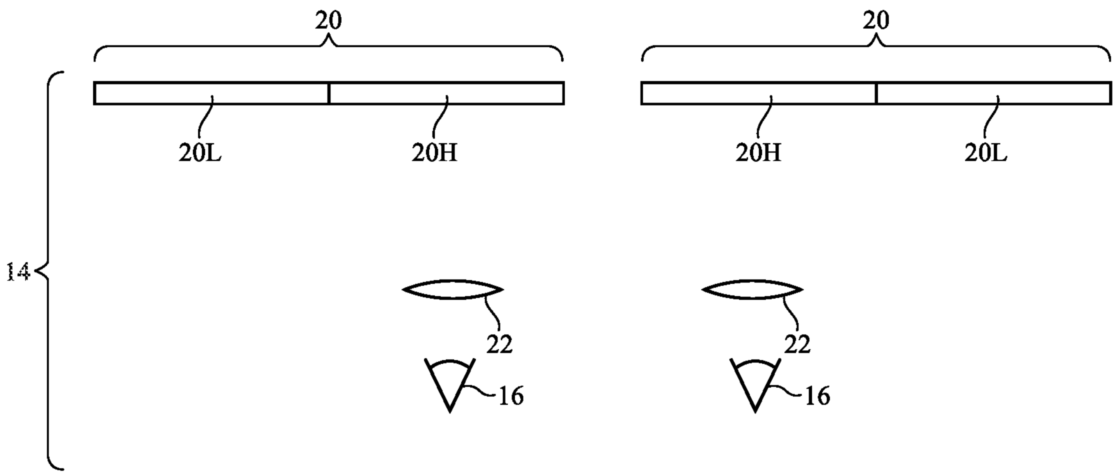
FIG. 2 is a diagram showing how an electronic device may have a pair of displays each having lower resolution and higher resolution areas in accordance with an embodiment.

FIG. 2 is a diagram showing how device 14 may have a pair of displays 20 for the left and right eyes 16 of the viewer, respectively. The left-hand display 20 may have a left-hand lower-resolution peripheral area 20L and a right-hand higher-resolution area 20H. The right-hand display 20 may have a right-hand lower-resolution peripheral area 20L and a left-hand higher-resolution area 20H. Any gap between displays 20 may be hidden from view by selecting lenses 22 with appropriate magnifications (e.g., so that the images on displays 20 merge in the viewer's vision).

Figure 3:
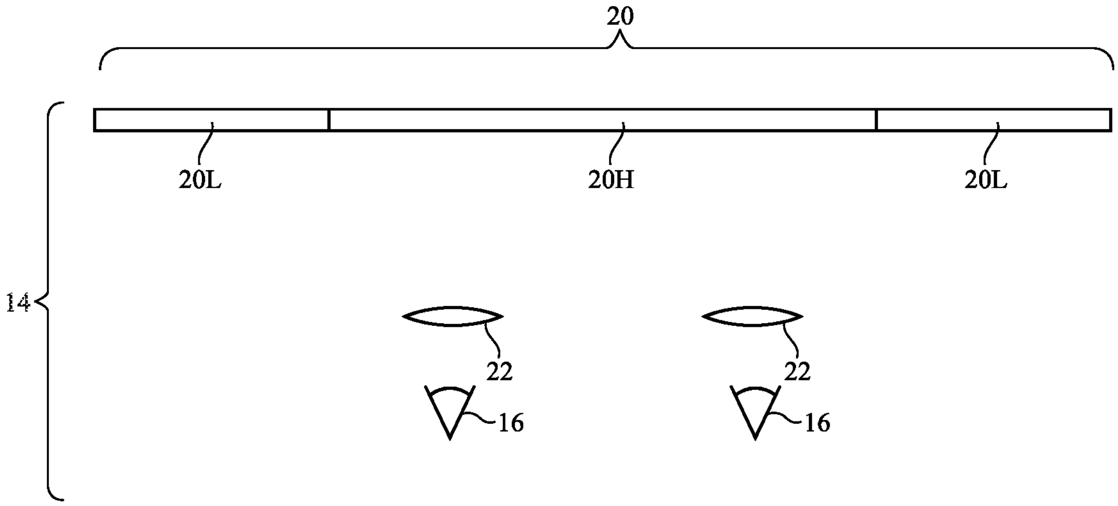
FIG. 3 is a diagram showing how an electronic device may have a display with a higher resolution central area flanked by lower resolution peripheral areas in accordance with an embodiment.

FIG. 3 shows how device 14 may have a single display 20 with a single higher-resolution central portion 20H flanked on opposing left and right edges by lower-resolution portions 20L.

Lower resolution areas for displays 20 may have, for example, resolutions of 10-600 pixels per inch, 10-300 pixels per inch, fewer than 150 pixels per inch, more than 10 pixels per inch, etc. Higher resolution areas may have, for example, pixel resolutions of 400-2000 pixels per inch, more than 150 pixels per inch, more than 500 pixels per inch, more than 1000 pixels per inch, fewer than 2000 pixels per inch, etc. These are merely illustrative examples. In general, the lower and higher resolution areas of displays 20 may have any suitable resolutions (pixels per inch).

Figure 4:
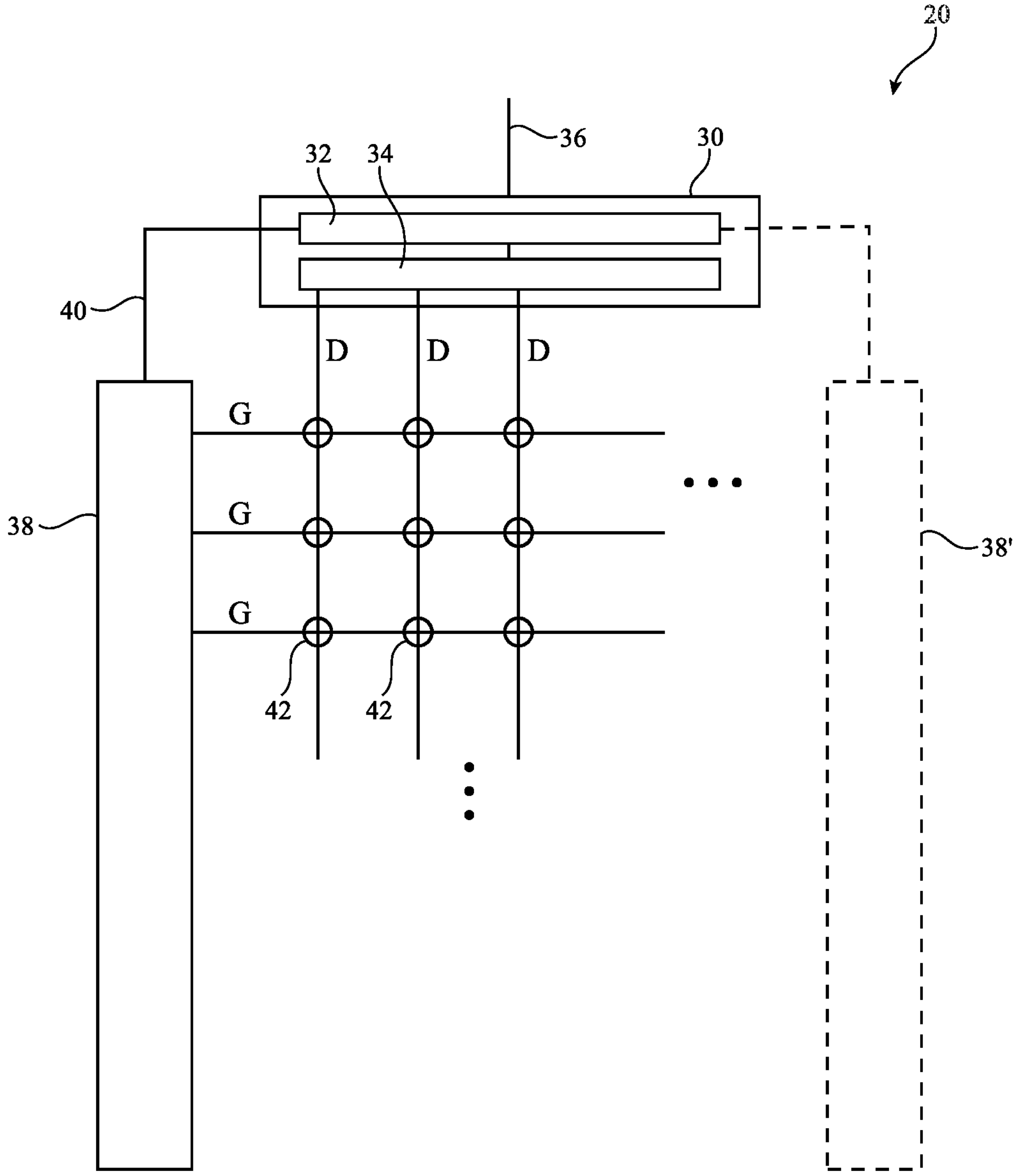
FIG. 4 is a circuit diagram of an illustrative display in accordance with an embodiment.

FIG. 4 is a circuit diagram of an illustrative display. As shown in FIG. 4, display 20 may have control circuitry 30 that receives image data (e.g., serial image data) over path 36 from a data source in control circuitry 26 or other suitable data source. Images corresponding to the image data received on path 36 may be displayed on a pixel array formed from rows and columns of pixels 42. Display driver circuitry 30 may be formed from one or more integrated circuits and may include timing controller circuitry (TCON) such as circuitry 32 (sometimes referred to as digital-to-analog converter circuitry) and data line driver circuitry (sometimes referred to as column driver or column buffer circuitry) such as data line driver circuitry 34. Control signals may be supplied by display driver circuitry 30 to other display driver circuitry such as gate line driver circuitry 38 using paths such as path 40. There may be gate line driver circuitry such as gate driver circuitry 38 on one or both edges of display 14 (see, e.g., illustrative right-hand gate line driver circuitry 38').

During operation, display driver circuitry 30 may supply image data to the pixel array formed from pixels 42 using data lines D while directing gate drive circuitry 38 to supply rows of pixels 42 with one or more control signals (sometimes referred to as gate signals, gate line signals, scan signals, emission enable signals, etc.) on gate lines G. There may be any suitable number of gate lines G per row of pixels 42. Configurations with a single gate line G per row may sometimes be described herein as an example.

Figure 5:
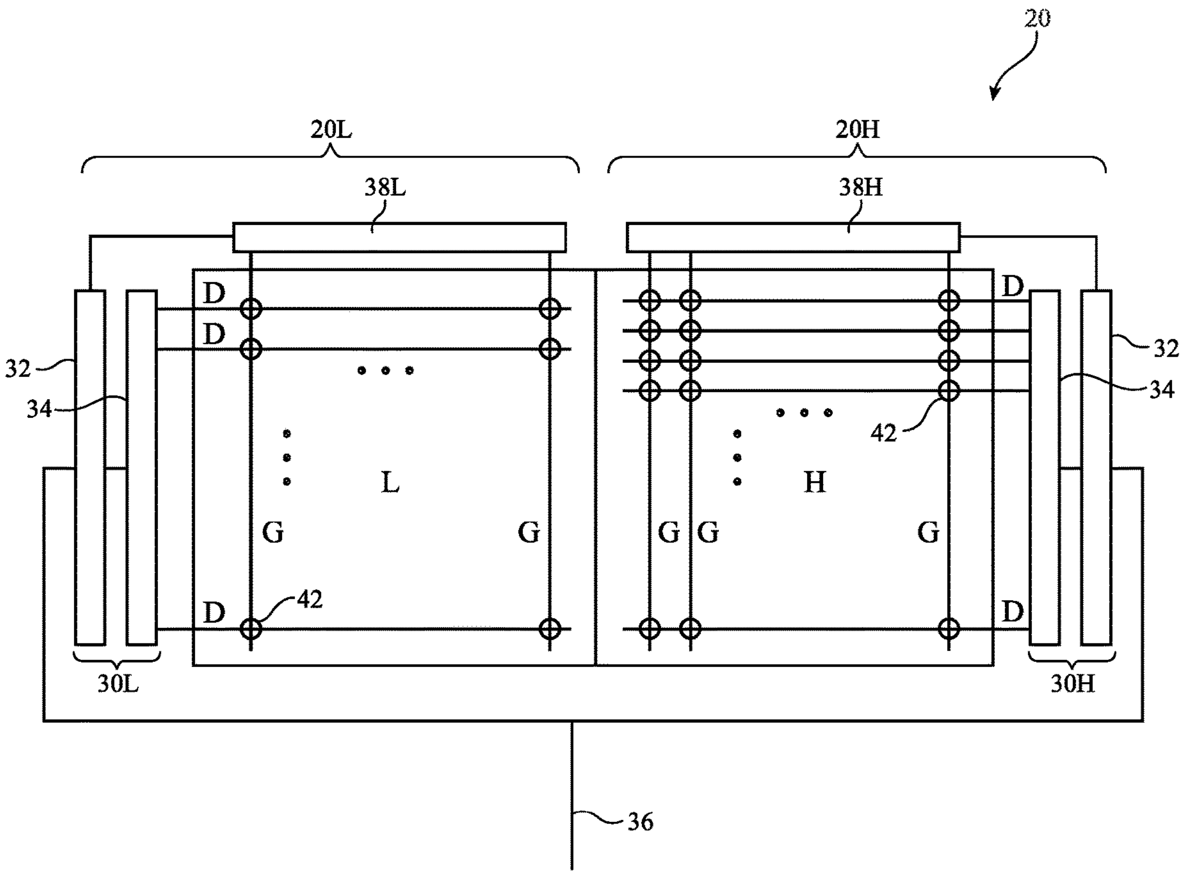
FIG. 5 is a diagram of an illustrative display with lower resolution and higher resolution areas driven by data line driver circuits on opposing edges of the display in accordance with an embodiment.

FIG. 5 is a diagram showing how display 20 may have a lower resolution portion 20L and a higher resolution portion 20H that are driven by respective gate driver circuits 38L and 38H and respective display driver circuits 30L and 30H. Display driver circuits 30L and 30H have respective data line driver circuits 34. The density of data lines D is lower in display portion 20L than in portion 20H, because there are fewer pixels per gate line to load with data in portion 20L than in portion 20H. If desired, the pixel area of each pixel 42 may vary in the transition region between display portions 20L and 20H to help visually hide the interface between areas 20L and 20H. Pixel area may be varied by, for example, varying anode area (and therefore light emission area) in the light-emitting diode of each pixel 42 in an organic light-emitting diode display.

Figure 6:
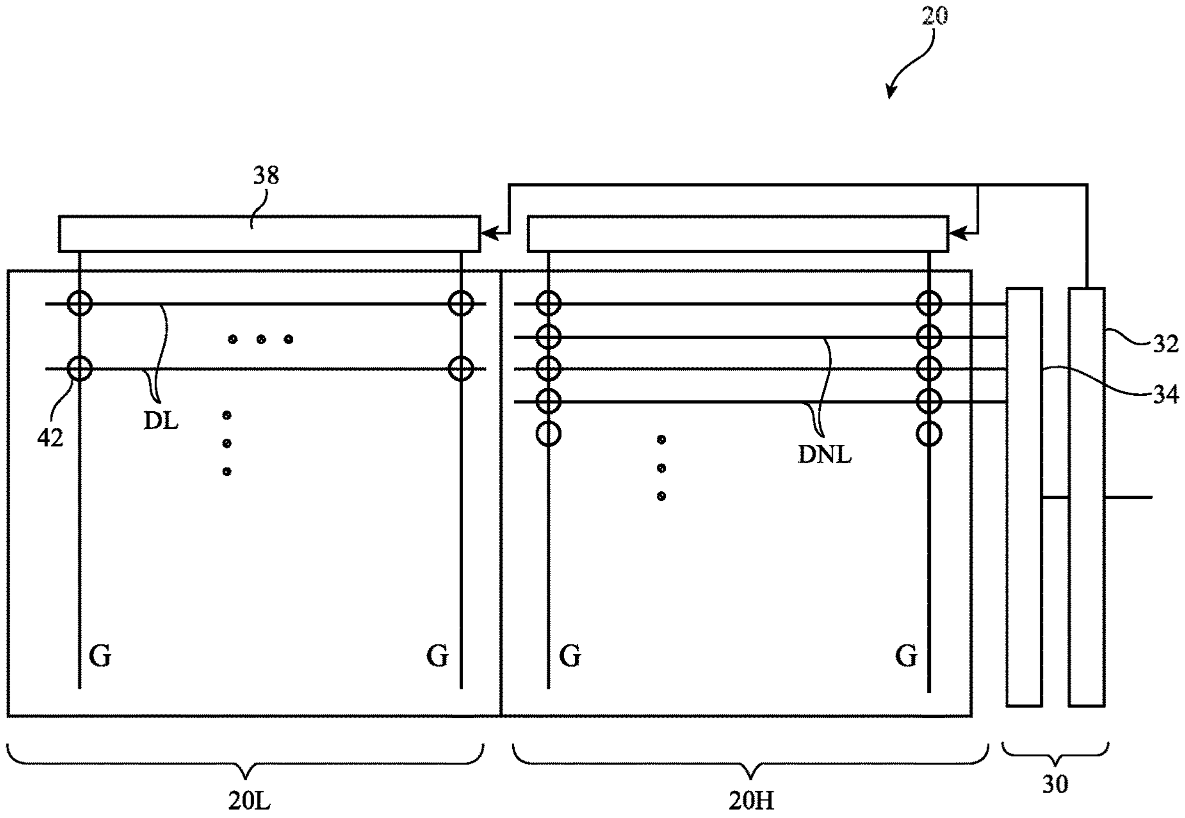
FIG. 6 is a diagram of an illustrative display with lower resolution and higher resolution areas using shared data lines in accordance with an embodiment.

In the illustrative configuration of FIG. 6, long data lines DL extend through both regions 20L and 20H and interleaved short data lines DNL extend only through high resolution region 20H.

Figure 7:
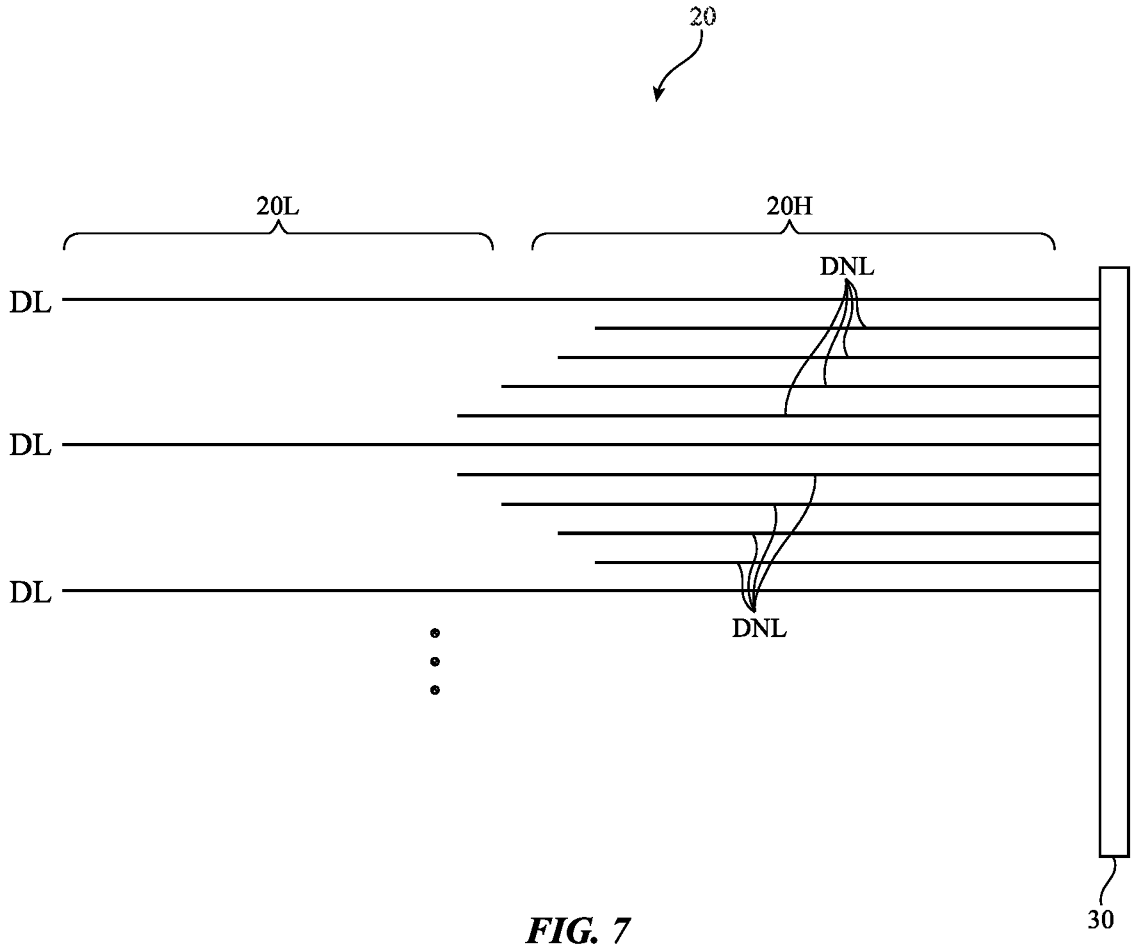
FIG. 7 is a diagram showing how a display with lower and higher resolution areas may have a transition zone with data lines having staggered lengths in accordance with an embodiment.

FIG. 7 shows how the lengths of short data lines DNL may be varied (staggered) in the transition regions between lower-resolution portion 20L of display 20 and higher-resolution portion 20H of display 20. This helps visually smooth out any differences in appearance between portions 20H and 20L so that the interface between regions 20L and 20H is not noticeable to a viewer. If desired, pixel size and/or other attributes may be varied in the transition region between portions 20H and 20L to minimize visual differences between portions 20H and 20L.

Figure 8:
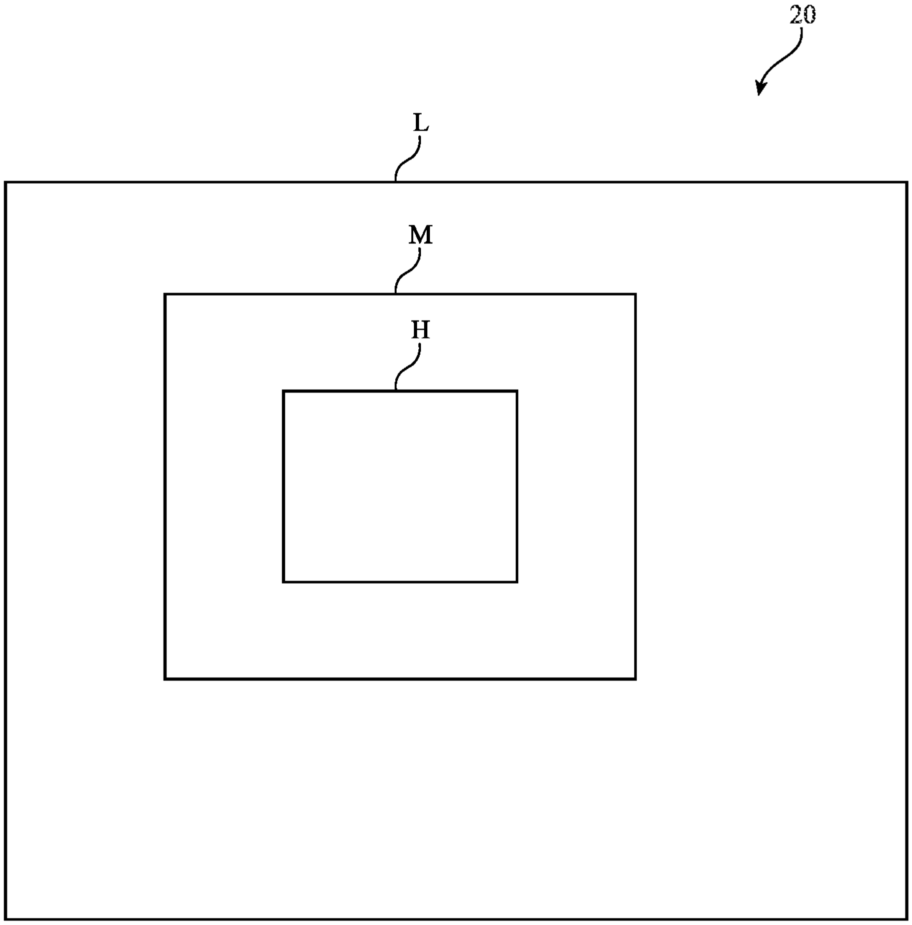
FIG. 8 is a diagram showing how different portions of a display may present images with different resolutions in accordance with an embodiment.

If desired, the resolution of displays 20 (e.g., selected areas of displays 20) may be dynamically adjustable. With this type of arrangement, each display 20 may have two or more or three or more different areas with different respective resolutions. As shown in FIG. 8, for example, display 20 may have first portion (e.g., a portion directly in the user's line of sight) with a high resolution such as high-resolution portion H, may have a second portion (e.g., a more peripheral portion) with a medium resolution such as medium-resolution portion M, and may have a lower-resolution peripheral portion such as lower-resolution portion L. The shapes, sizes, and locations of portions H and M may be varied dynamically (e.g., based on information from a gaze detection system (e.g., camera 24) indicating the current direction in which a user's gaze is directed).

With one illustrative configuration, the gate lines of display 20 are controlled independently (in high resolution areas) and are controlled in sets of two or more (in lower resolution areas). With this arrangement, gate lines are not shorted together (coupled together) when used to control the pixels of display 20 in higher resolution areas and are shorted together (coupled together) and driven with common gate line signals when used to control the pixels of display 20 in lower resolution areas. Any suitable subpixel pattern may be used to support a display with dynamic resolution capabilities such as these, if desired.

Figure 9:
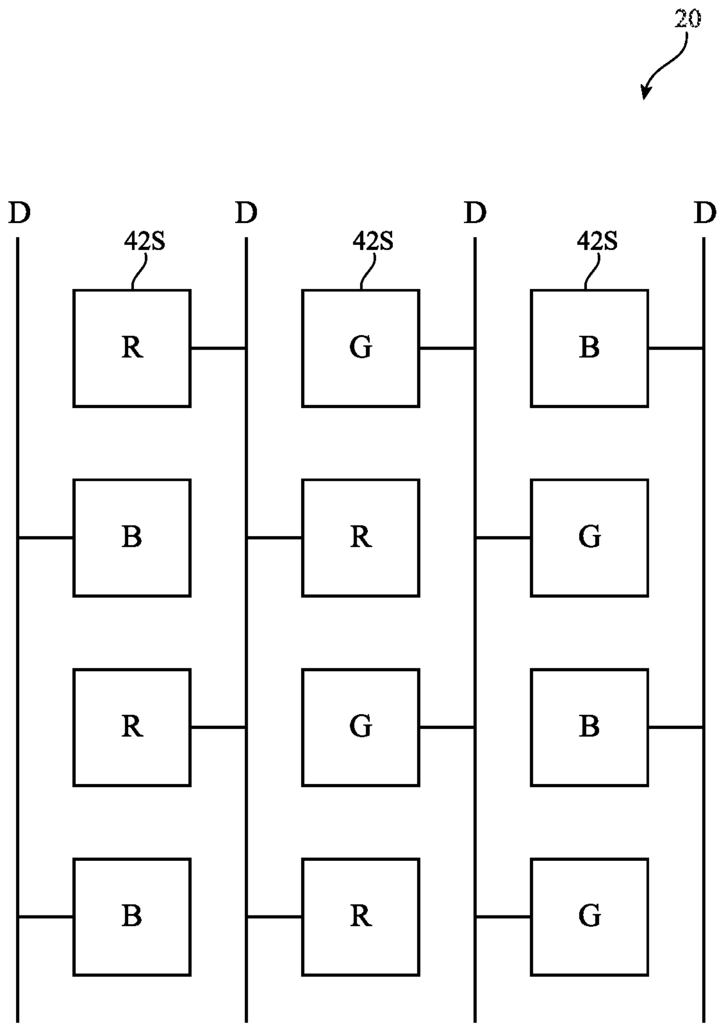
FIG. 9 is a diagram showing how a pixel array with zig-zag data lines may have data lines that each control subpixels of only a single color to allow different regions of the display to be configured to have different resolutions using dynamically adjustable gate line driver circuitry in accordance with an embodiment.

In the example of FIG. 9, display 20 has data lines D that are connected to red R, blue B, and green G subpixels 42S in a zig-zag pattern. With this type of pattern, each data line is coupled exclusively to subpixels of a single color and is only used to load data for subpixels of the same color. Gate line resolution can be lowered for this type of display by driving common gate line signals into multiple adjacent gate lines, without disrupting image coloring. Data driver frequency may be high when high resolution areas are being loaded with data and can be reduced when lower resolution areas are being loaded.

Figure 10:
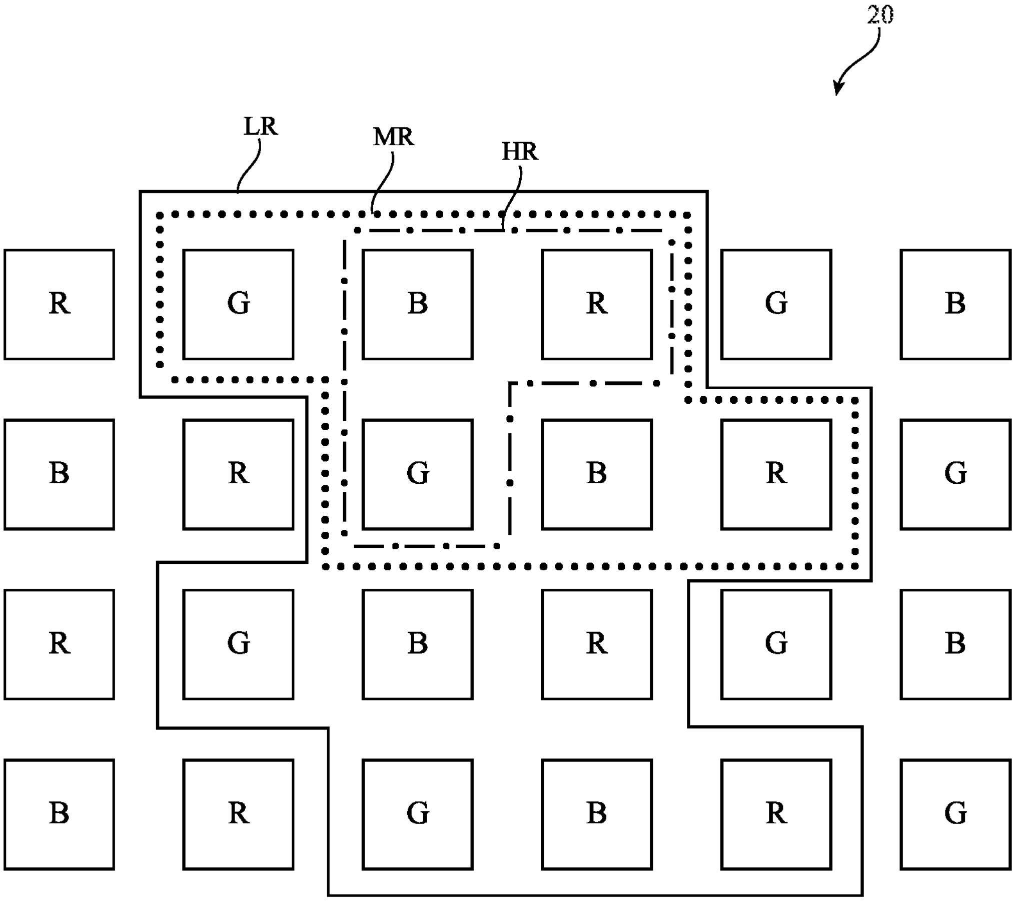
FIG. 10 is a diagram showing how subpixels can be grouped in different ways to form pixels of dynamically adjustable sizes when areas of a display are being operated with different resolutions in accordance with an embodiment.

As shown in the illustrative subpixel arrangement of FIG. 10, which involves applying dynamically adjusted gate line signals and dynamically adjusted data line signals, display 20 may have pixels 42 with RGB subpixels 42S that can be configured in different pixel shapes (tile shapes) and sizes depending on desired resolution. When high (native) resolution is desired, each pixel 42 may include a single red subpixel, a single green subpixel, and a single blue subpixel, as illustrated by pixel HR. When medium resolution is desired, each pixel 42 may include two red subpixels, two green subpixels, and a two blue subpixels, as illustrated by pixel MR. A larger pixel layout for pixels such as pixel LR may be used for low resolution areas of display 20. As shown in FIG. 10, each low resolution pixel LR may, as an example, have four red subpixels, four green subpixels, and four blue subpixels.

Figure 11:
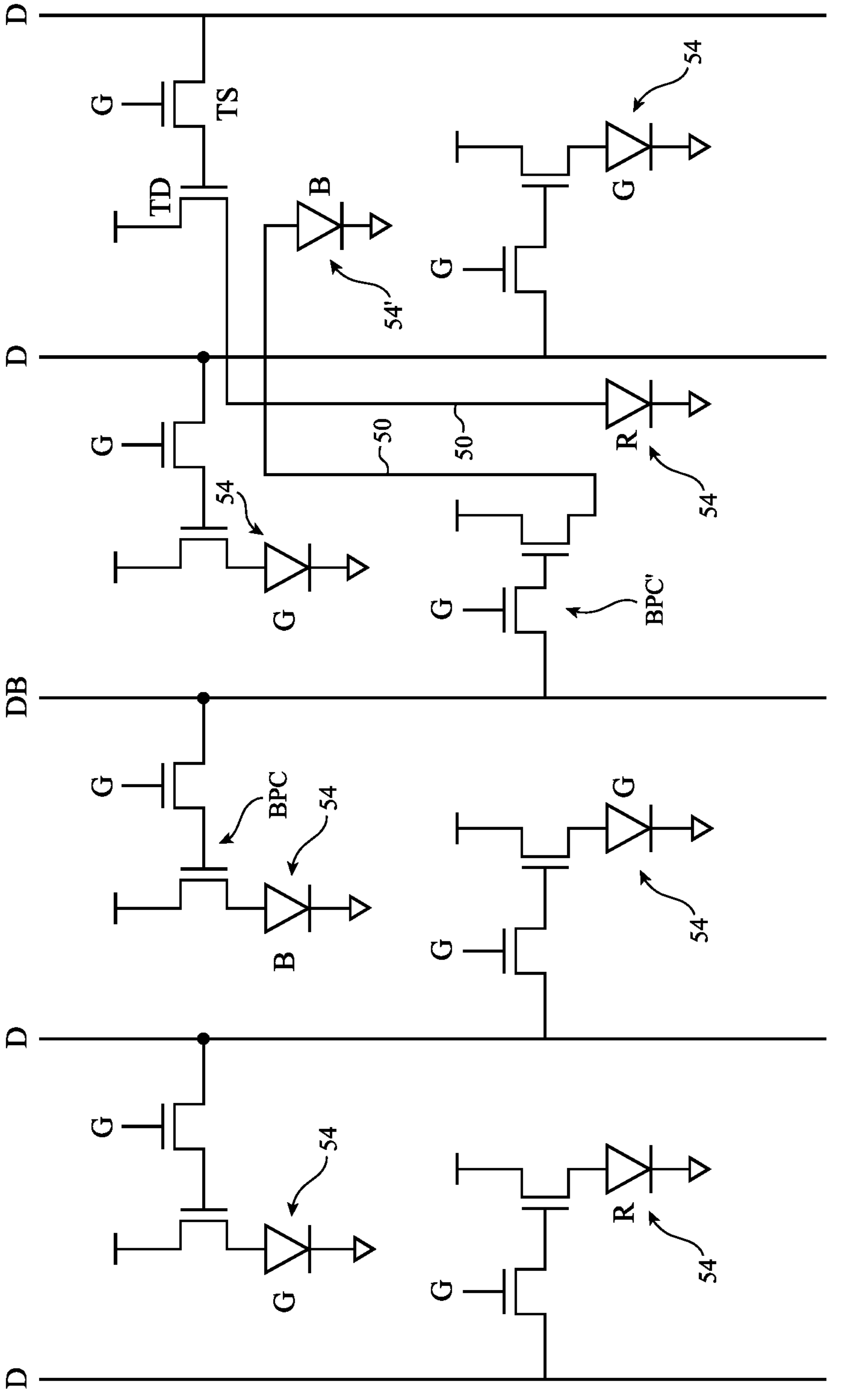
FIG. 11 is a diagram showing how a pixel array may be provided with cross-over connections that traverse subpixel columns in the array to facilitate operation in modes with different resolutions in accordance with an embodiment.

Illustrative display 20 of FIG. 11 has rows with either alternating green and blue subpixels or alternating red and green subpixels. To ensure that each data line D controls only subpixels of a common color (e.g., all red subpixels, all blue subpixels, or all green subpixels) to allow dynamic gate line signal adjustment to selectively control display resolution, every other blue or red data line uses cross-routing paths such as paths 50 to couple a pixel circuit (e.g., illustrative switching transistor TS and illustrative drive transistor TD) that is receiving data from that data line to an appropriately colored light-emitting diode 54 in the adjacent column. For example, a data line that is associated with blue subpixels such as illustrative data line DB may be used to load data into blue pixel circuits that are adjacent to (immediately to the left of) line DB. Some of these pixel circuits such as pixel circuit BPC may be used to control the application of current through blue light-emitting diodes 54 in the blue pixel circuits. Other blue pixel circuits such as blue pixel circuit BPC' are used to supply drive current to blue light-emitting diodes such as blue light-emitting diode 54' via associated cross-routing paths 50. Pixel circuit BPC' is immediately to the right of line DB, so cross-routing path 50 crosses over a green subpixel data line (i.e., a non-blue data line) before reaching blue light-emitting diode 54'.

Figure 12:
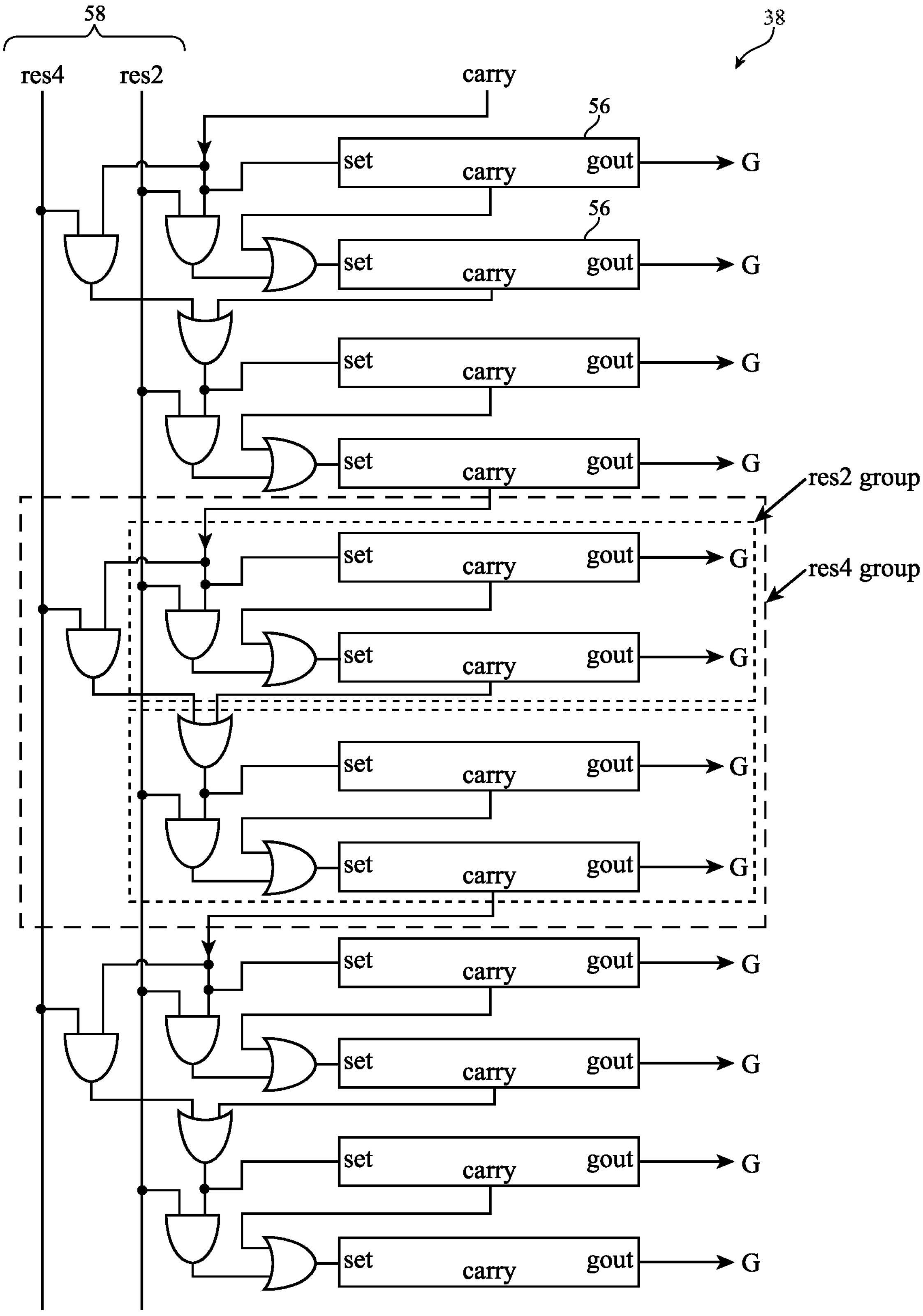
FIG. 12 is a circuit diagram of illustrative gate driver circuitry that may supply gate line signals to different areas of a display with different resolutions in accordance with an embodiment.
Figure 13:
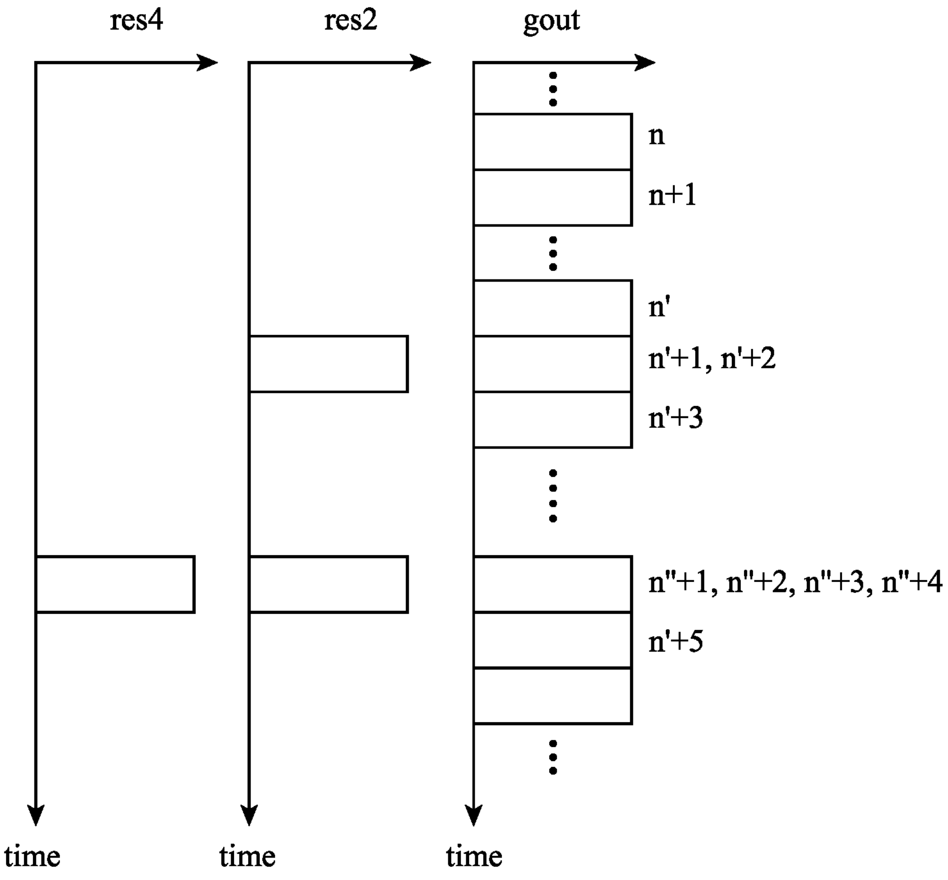
FIG. 13 is a diagram of signals associated with operating the gate driver circuitry in different modes in accordance with an embodiment.

If desired, gate driver circuitry 38 may be used to assert gate lines G independently for high resolution regions and may be used to assert gate lines G in dynamically adjustable sets (e.g., sets of two or sets of four, etc.) in lower resolution regions. Illustrative gate driver circuitry 38 that supports a dynamic gate line resolution capability for display 20 is shown in FIG. 12. Gate driver circuitry 38 include a shift register circuit formed from a chain of coupled register circuits 56 each of which supplies a gate line signal to a respective gate line G. The shift register is loaded in series (e.g., from top to bottom in the example of FIG. 12). Gate driver circuitry control logic 58 may be controlled by control signals res2 and res4 and may be used to place gate driver circuitry 38 in one of three modes, as illustrated in the signal diagram of FIG. 13. In the highest resolution mode (sometimes referred to as normal or native mode), res2 is low and res4 is low. In this mode, each gate line G is provided with an independent gate line signal from a respective register circuit 56. To place gate driver circuitry 38 in a medium resolution mode in which pairs of gate lines G are provided with common gate line signals (i.e., in which pairs of adjacent gate lines G are electrically coupled together and receive the same gate line signal), res2 may be taken high and res4 may be taken low. Gate driver circuitry 38 may also be operated in a low resolution mode by taking res4 high and res2 high. In low resolution mode, each set of four gate lines G at the output of circuitry 38 is driven with a common gate line signal.

If desired, both gate driver circuitry 38 and display driver circuitry 30 may be dynamically reconfigured. In this way, regions of display 20 may be provided with gate line signals with dynamically adjustable resolution and with data line signals with dynamically adjustable resolution.

Figure 14:
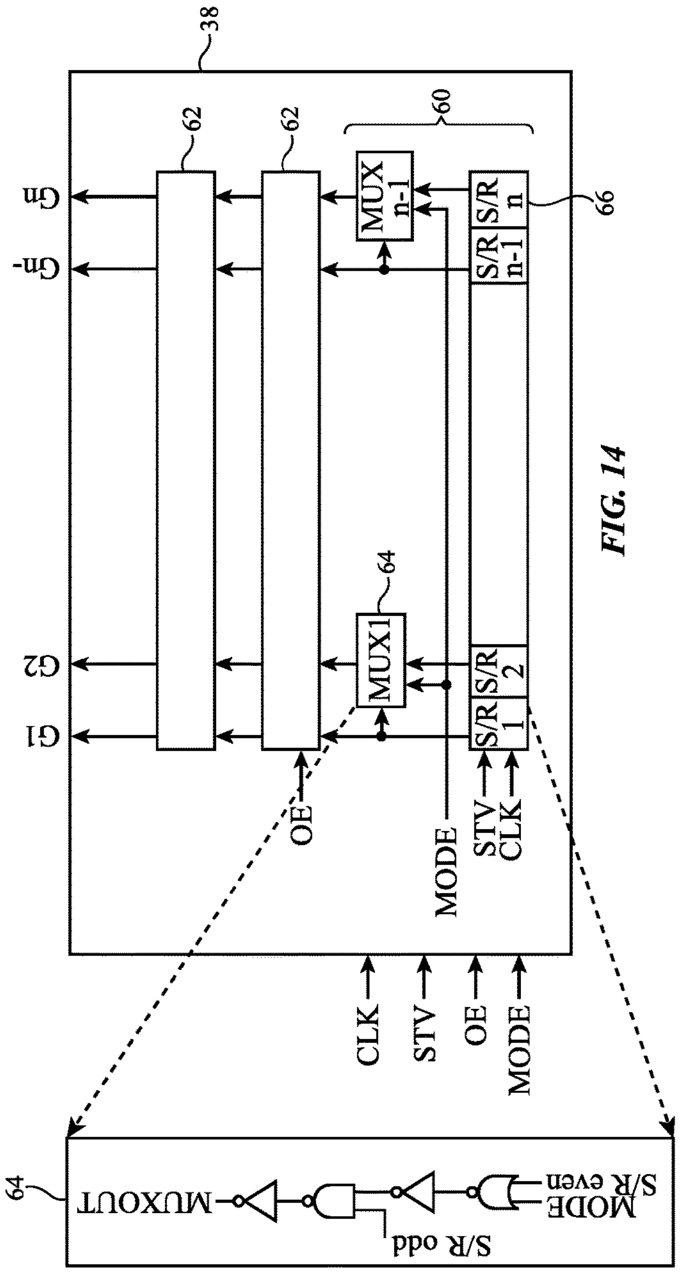
FIG. 14 is a diagram of data line driver circuitry that may be used to control data lines in a display with different areas having different resolutions in accordance with an embodiment.
Figure 15:
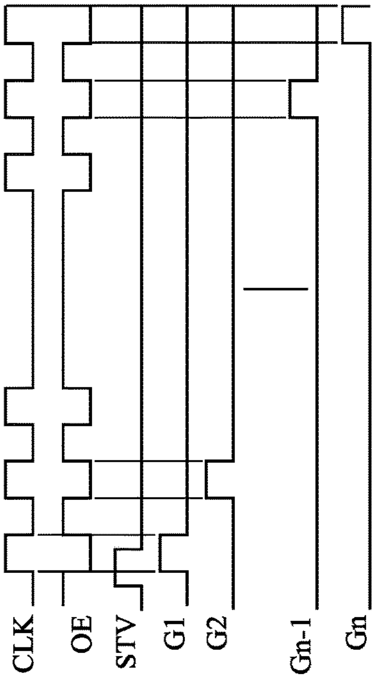
FIGS. 15 and 16 are illustrative timing diagrams for signals associated with operating the data line driver circuitry of FIG. 14 in different modes in accordance with an embodiment.
Figure 16:
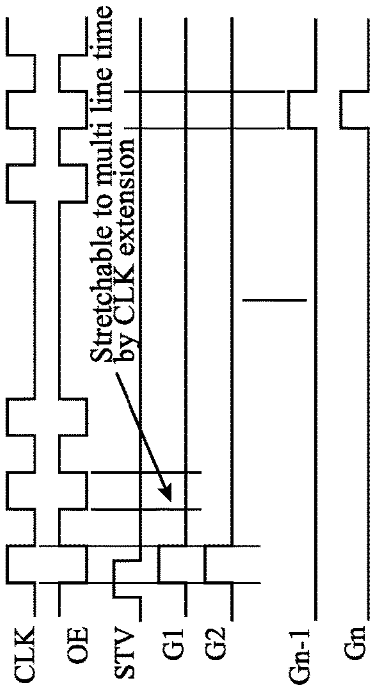

Illustrative display driver circuitry for dynamically adjusting gate line resolution in this type of display is shown in FIG. 14. As shown in FIG. 14, gate driver circuitry 38 may have low voltage shift-register circuitry 60, a level-shifter circuit 62, and output buffer circuitry 64 (e.g., circuitry that produces gate line signals G1 . . . GN at voltages suitable for driving pixels 42). Circuitry 60 may include a shift register such as shift register 66 that is loaded with gate line signals for each image frame and that provides corresponding gate line signals to multiplexers 64. Multiplexers 64 may be controlled by control signals such as MODE. FIGS. 15 and 16 show the operation of gate driver circuitry 38 in high and low resolution modes, respectively. When it is desired to drive the gate lines independently, circuitry 38 is placed in high resolution mode by taking MODE low, as shown in FIG. 15. In this mode each gate line G1 . . . GN supplies the array of pixels in display 20 with a separate gate line signal and adjacent gate lines are isolated from each other. When it is desired to combine pairs of adjacent gate lines and thereby cut the resolution in half, MODE is taken high, as shown in FIG. 16. When resolution is cut in half in this way, adjacent pairs of gate lines are shorted (electrically coupled) together by multiplexers (switch circuits) 64 and therefore supply display 20 with the same gate line signals. During operation, start signal STV starts a cascade of gate signals through shift register 66. Clock signal CLK and output enable signal OE establish pulse widths.

In the example of FIGS. 14, 15, and 16, gate driver circuitry 38 can be placed in a higher resolution mode or a lower resolution mode in which each multiplexer 64 drives a common gate line signal onto two gate lines. If desired, multiplexers 64 may drive common gate line signals onto other numbers of gate lines (e.g., three, etc.). The operation of gate driver circuitry 38 (i.e., the resolution of gate driver circuitry 38) may be changed dynamically within an image frame, so that any desired portion of display 20 can be selectively provided with gate line signals of reduced resolution.

Figure 17:
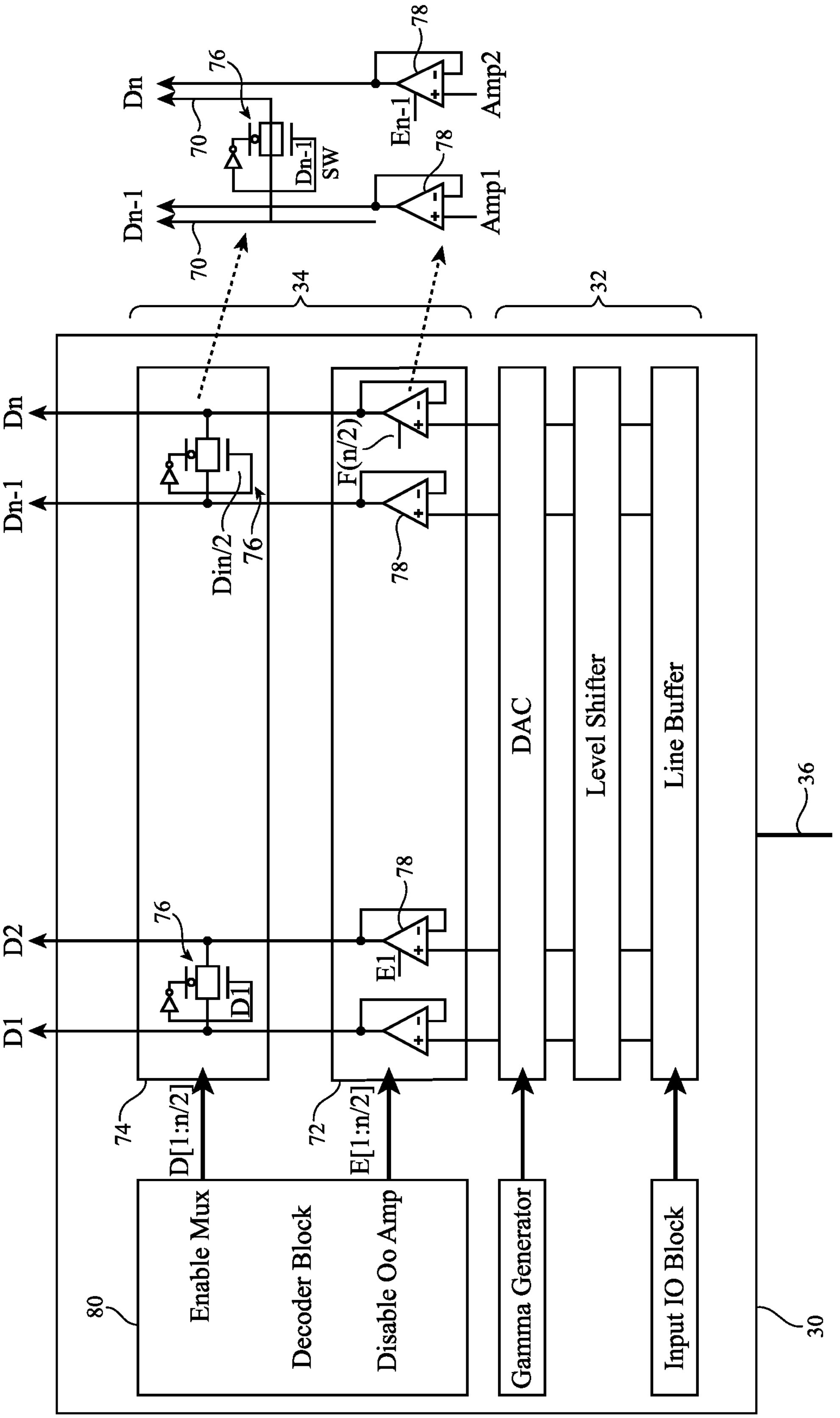
FIG. 17 is a circuit diagram of data line driver circuitry having switches to merge data lines in accordance with an embodiment.

FIG. 17 is a circuit diagram of dynamically adjustable data line driver circuitry (i.e., data line driver circuitry having an adjustable resolution) having switches to merge data lines when it is desired to dynamically adjust data line resolution (e.g., for a display having a dynamically adjustable gate line resolution provided using circuitry 38 of FIG. 14 or other suitable dynamically adjustable gate driver circuitry). As shown in FIG. 17, display driver circuitry 30 may include digital-to-analog converter circuitry 32 (sometimes referred to as timing controller circuitry) that converts digital image data from path 36 into analog data signals on data lines D1 . . . DN. Column buffer circuitry 72 may have an operational amplifier (column buffer) 78 in each column (i.e., a column buffer associated with each data line). Data line multiplexer circuitry 74 may have switches (multiplexers) 76 that are used to selectively short (electrically couple) adjacent data lines together. Operational amplifier circuitry 72 and switching circuitry 74 may be controlled by control circuitry in circuitry 30 (e.g., control circuitry 80).

Column buffer circuitry 72 may take unbuffered data signals from circuitry 32 and may strengthen these signals for loading into pixels 42 over data lines D1 . . . DN. In high resolution mode, switches 76 are open and adjacent data lines are operated independently (e.g., Dn-1 and Dn are electrically isolated from each other and are not shorted together, etc.). In low resolution mode, data line multiplexing circuitry is configured to drive adjacent data lines using common data signals. As shown on the right-hand side of FIG. 17, for example, a first of column buffers 78 (e.g., amp1) may be used to drive a data signal into both data line Dn-1 and data line Dn (as illustrated by path 70). The unused column buffer (amplifier amp2 in this example), can be disabled by applying a disable signal to its enable line (En-1) to minimize static current consumption. As with the adjustments made to gate line resolution, the circuitry of FIG. 17 may dynamically change data line resolution within an image frame.

Figure 18:
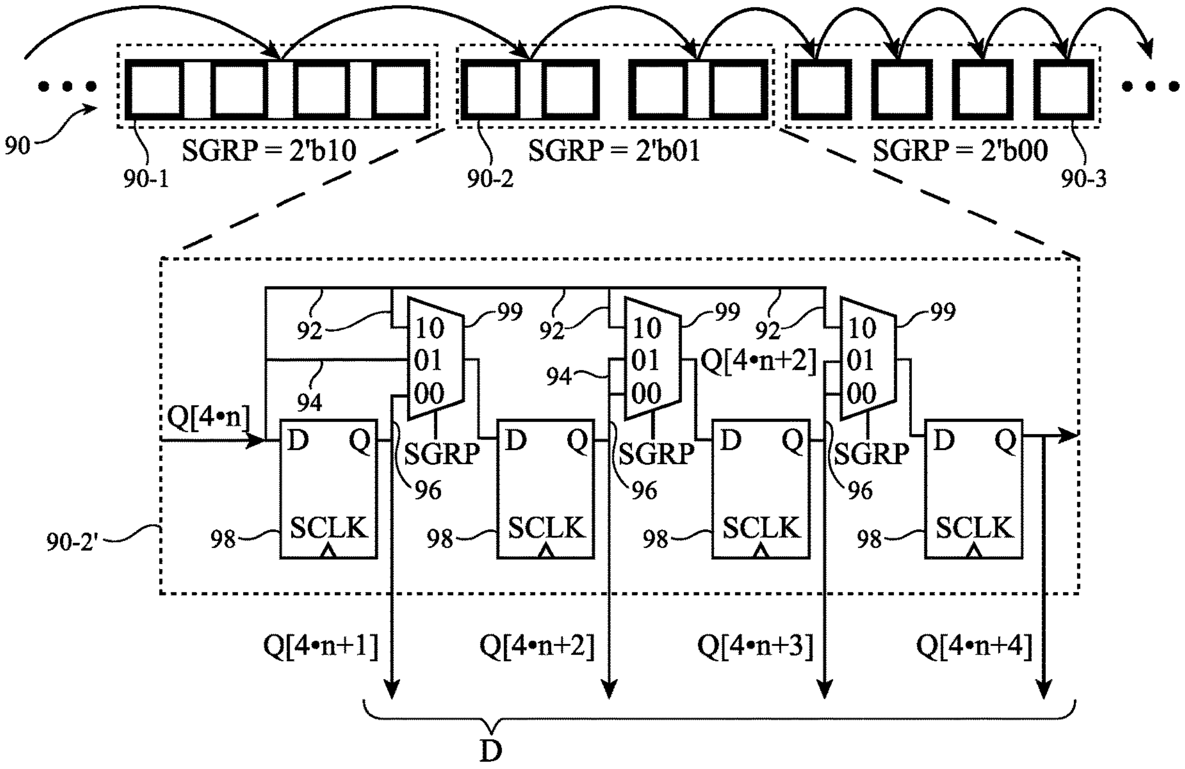
FIG. 18 is a diagram of illustrative data line driver circuitry containing an adjustable-mode shift register in accordance with an embodiment.

FIG. 18 is a diagram of illustrative data line driver circuitry (see, e.g., display driver circuitry 34 of FIG. 4) that may be used in supplying data signals to a pixel array (e.g., an array of pixels 42 of FIG. 2) in various resolutions (see, e.g., FIG. 8).

As shown in FIG. 18, the data line driver circuitry may include adjustable-mode shift register circuitry such as adjustable-mode shift register 90. During operation, shift register 90 may be supplied with data to be loaded into the pixel array. Shift register 90 may be formed from a chain of multi-register register blocks such as illustrative register blocks 90-1, 90-2, and 90-3. Each register block may contain four individual registers 98 interconnected by multiplexer circuitry such as multiplexers 99, as shown in circuitry 90-2' for block 90-2. Multiplexer circuitry 99 may be supplied with a two-bit mode control signal (resolution mode control signal) SGRP that allows the register block to be placed in multiple different resolution modes.

The value of SGRP may, for example, be 10, 01, or 00. As shown by paths 92 and associated multiplexer circuitry 99 of circuitry 90-2', in the 10 mode, data supplied to the data input of the first register in the register block may be distributed in parallel to the data inputs of the second, third, and fourth registers 98. In the 10 mode, all four registers 98 in the register block are therefore loaded together with the same data bit over a single clock cycle (single pulse of clock signal SCLK), as is suitable when loading low resolution data (e.g., quarter resolution data) for a low-resolution portion of the pixel array. Paths 94 and multiplexer circuitry 99 are used to load data into pairs of registers in parallel during the 01 mode. On a first clock cycle in the 01 mode, a first bit of data is loaded into the first and second registers in the register block. On a second clock cycle in the 01 mode, this first bit of data is shifted to the third and fourth registers of the register block and a second bit of data is loaded into the first and second registers. Register blocks in shift register 90 are operated in the 01 mode when it is desired to load a corresponding portion of the pixel array with half-resolution data. Register blocks that are associated with full resolution data are operated in the 00 mode. In the 00 mode, four clock cycles are used to load four separate bits of data into four respective registers in the register block.

Table 100 of FIG. 18 summarizes the different operating modes (data line resolutions) supported by the register blocks of register 90. When resolution mode selection signal SGRP is 00, data is output on data lines D at full resolution (one data bit per each data line). When resolution mode selection signal SGRP is 01, data is output on corresponding data lines D at half resolution (each pair of adjacent data lines carries the same data bit). When resolution mode selection signal SGRP is 10, data is output on corresponding data lines D at quarter resolution (each set of four adjacent data lines carries the same data bit). Additional resolution modes may be supported, if desired. The use of three different resolution modes in the example of FIG. 18 is merely illustrative.

Figure 19:
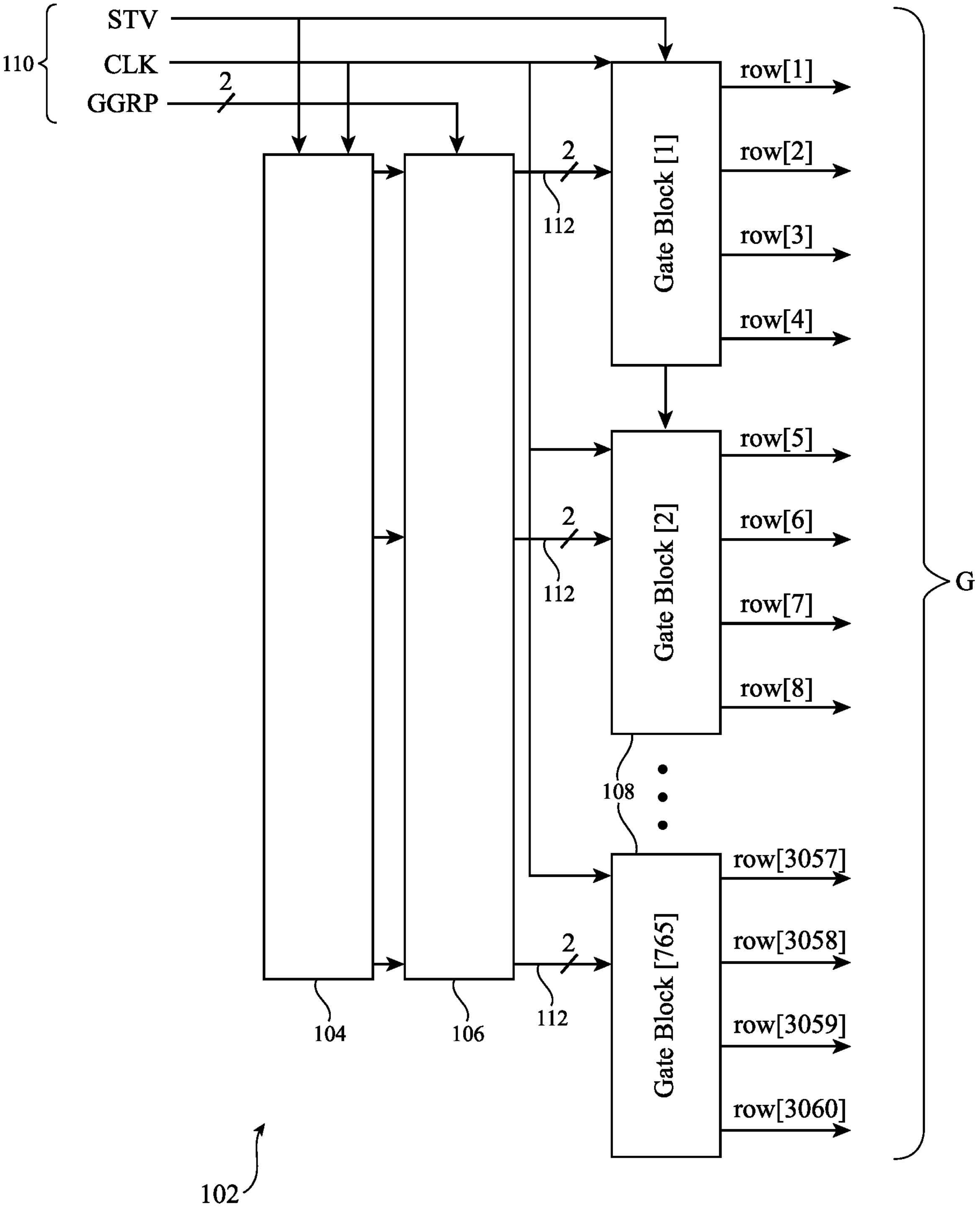
FIG. 19 is a diagram of illustrative gate line driver circuitry containing gate blocks operable in multiple modes in accordance with an embodiment.

FIG. 19 is a diagram of illustrative gate driver circuitry (horizontal control line circuitry 102) for controlling an array of pixels 42 in different resolution modes. Any suitable horizontal control signals may be controlled using this type of circuitry (scan signals, emission enable signals, etc.). In the example of FIG. 19, horizontal control lines such as gate lines G are supplied with gate lines signals at the output of horizontal control line circuitry 102.

As shown in FIG. 19, circuitry 102 receives control signals 110. Circuitry 102 includes a shift register such as shift register 104 and a latch such as latch 106. Clock signal CLK is distributed to register 104, latch 106, and a shift register formed from a chain of gate blocks 108. Shift register 104 receives start pulse control signal STV and, upon receiving signal STV and in response to clock signal CLK, produces sequential control signals for latch 106. In response, latch 106 provides control signals on gate block control lines 112 to respective gate blocks 108 that dynamically configure blocks 108.

Each gate block 108 has four respective outputs and has two control signal inputs (e.g., inputs for receiving a two-bit control signal fed respectively by signals on lines 112 from registers in latch 106 associated with the most significant bit of resolution mode control signal GGRP and the least significant bit of resolution mode control signal GGRP).

The value of GGRP can be dynamically adjusted to adjust the mode in which each gate block 108 supplies its output signals. In 10 mode (e.g., when GGRP for a block is 10), the four output pulses of that block will be asserted in parallel on the same clock cycle, thereby loading four successive rows of pixels 42 with data in parallel. When a gate block 108 is operated in 01 mode, the four output pulses from that block are staggered in pairs. For example, a first output pulse may be asserted simultaneously on the first and second rows of pixels 42 for that block during a first clock cycle and a second output pulse may then be asserted simultaneously on the third and fourth rows of pixels 42 for that block during a second clock cycle. In the 00 mode (e.g., when GGRP for a block is 00), a first output pulse is asserted on an output in first row for that block on a first clock cycle, a second output pulse is asserted on an output in a second row for that block on a second clock cycle, a third output pulse is asserted on an output in a third row for that block on a third clock cycle, and a fourth output pulse is asserted on an output in a fourth row for that block on a fourth clock cycle.

In accordance with an embodiment, an electronic device is provided that includes at least one lens, an array of pixels configured to produce light that passes through the lens, data lines, data line driver circuitry configured to supply data signals to the pixels over the data lines with a dynamically adjustable resolution, the data line driver circuitry includes data line multiplexer circuitry that is dynamically configurable to short adjacent data lines together, gate lines coupled to the pixels, and gate line driver circuitry configured to supply gate line signals to the pixels over the gate lines with a dynamically adjustable resolution.

In accordance with another embodiment, the gate line driver circuitry includes gate line multiplexers that are configurable to short pairs of adjacent gate lines together.

In accordance with another embodiment, the gate line driver circuitry includes a shift register having register circuits, each of the register circuits is coupled to a respective one of the gate lines, and control circuitry coupled to the shift register that is configured to place the shift register in different modes.

In accordance with another embodiment, the different modes include at least a first mode in which each of the register circuits supplies an independent gate line signal to the respective one of the gate lines coupled to that register circuit and at least a second mode that is different than the first mode.

In accordance with another embodiment, the different modes include a third mode, the gate driver circuitry is configured to supply the gate line signals with a first resolution in the first mode, a second resolution in the second mode, and a third resolution in the third mode.

In accordance with another embodiment, the data line multiplexer circuitry includes a plurality of switches each of which is coupled between respective first and second data lines.

In accordance with an embodiment, an electronic device is provided that includes at least one lens, an array of pixels configured to produce light that passes through the lens, data lines, data line driver circuitry configured to supply data signals to the pixels over the data lines with a dynamically adjustable resolution, gate lines coupled to the pixel, and gate line driver circuitry configured to supply gate line signals to the pixels over the gate lines with a dynamically adjustable resolution, the gate line driver circuitry includes a plurality of gate blocks each of which receives a resolution mode control signal.

In accordance with another embodiment, the resolution mode control signal includes a two-bit control signal and the gate blocks are configured to operate in at least first, second, and third modes.

In accordance with another embodiment each gate block includes at least first, second, third, and fourth outputs and each gate block is configured to assert pulses on the first, second, third, and fourth outputs simultaneously in the first mode in response to receipt of a clock signal.

In accordance with another embodiment, in the second mode each gate block is further configured to assert pulses on the first and second outputs simultaneously in response to receipt of a first clock signal, and assert pulses on the third and fourth outputs simultaneously in response to receipt of a second clock signal that is different than the first clock signal.

In accordance with another embodiment, in the third mode each gate block is further configured to assert a pulse on the first output in response to receipt of a first clock signal, assert a pulse on the second output in response to receipt of a second clock signal that is different than the first clock signal, assert a pulse on the third output in response to receipt of a third clock signal that is different than the first and second clock signals and assert a pulse on the fourth output in response to receipt of a fourth clock signal that is different than the first, second, and third clock signals.

In accordance with another embodiment, the data line driver circuitry includes an adjustable shift register.

In accordance with another embodiment, the adjustable shift register includes a plurality of shift register blocks each of which includes at least first, second, third, and fourth registers.

In accordance with another embodiment, each of the shift register blocks is configured to operate in at least first, second, and third modes and in the first mode data is loaded into the first, second, third, and fourth registers in parallel.

In accordance with another embodiment, in the second mode data is loaded into the first and second registers in parallel on a first clock cycle and is shifted from the first and second registers into the third and fourth registers on a second clock cycle that is different than the first clock cycle.

In accordance with another embodiment, in the third mode data is loaded into the first, second, third, and fourth registers on separate clock cycles.

In accordance with an embodiment, a display is provided that includes an array of pixels, gate line driver circuitry having a shift register and a gate line multiplexer that receives gate line signals from the shift register, gate lines that are configured to supply the gate line signals to the array of pixels after the gate line signals have passed through the gate line multiplexer, and data line driver circuitry having column buffer circuitry through which data signals pass, and data lines that are configured to supply the data signals from the column buffer circuitry to the array of pixels, the data line driver circuitry has a data line multiplexer through which the data signals from the column buffer circuitry pass to the data lines.

In accordance with another embodiment, the data line multiplexer is configurable to operate in at least a first data line multiplexer mode in which each of the data lines receives an independent data line signal and a second data line multiplexer mode in which each adjacent pair of the data lines is provided with a common data line signal for that pair from the data line multiplexer.

In accordance with another embodiment, the gate line multiplexer is configurable to operate in at least a first gate line multiplexer mode in which each of the gate lines receive an independent gate line signal from the gate line multiplexer and a second gate line multiplexer mode in which each adjacent pair of the gate lines is provided with a common gate line signal for that pair from the gate line multiplexer.

In accordance with another embodiment, the data line multiplexer has a plurality of switches each of which is coupled to a respective pair of column buffers in the column buffer circuitry and each of which is coupled to a respective pair of the data lines.

The foregoing is merely illustrative and various modifications can be made to the described embodiments. The foregoing embodiments may be implemented individually or in any combination.

What is claimed is:

1. A display, comprising:

an array of pixels having rows and columns;

a plurality of gate lines that is configured to provide gate signals to the rows;

a plurality of data lines that is configured to provide data signals to the columns;

gate line driver circuitry configured to supply the gate signals to the plurality of gate lines; and data line driver circuitry configured to supply the data signals to the plurality of data lines, wherein the data line driver circuitry comprises:

column buffer circuitry with a plurality of operational amplifiers, wherein a subset of the plurality of operational amplifiers receives a first signal in a first resolution mode and wherein the subset of the plurality of operational amplifiers receives a second signal in a second resolution mode; and a data line multiplexer that is configured to provide the data signals from the column buffer circuitry to the data lines.

2. The display defined in claim 1, wherein the data line driver circuitry comprises digital-to-analog converter circuitry that converts digital image data into the data signals and wherein the data signals are analog data signals.

3. The display defined in claim 1, wherein each operation amplifier is associated with a respective data line of the plurality of data lines.

4. The display defined in claim 3, wherein, in the first resolution mode, the subset of the plurality of operational amplifiers is disabled.

5. The display defined in claim 4, wherein, in the first resolution mode, each operational amplifier in an additional subset of the plurality of operation amplifiers drives a single data signal into multiple data lines.

6. The display defined in claim 3, wherein, in the second resolution mode, the subset of the plurality of operational amplifiers is enabled.

7. The display defined in claim 1, wherein the gate line driver circuitry comprises a shift register and gate line multiplexer circuitry that is configured to provide the gate signals from the shift register to the gate lines.

8. The display defined in claim 7, wherein the gate line multiplexer circuitry comprises a plurality of gate line multiplexers that are controlled by a common mode control signal.

9. The display defined in claim 8, wherein at least one of the gate line multiplexers is configurable to operate in at least a first gate line multiplexer mode in which each of the gate lines receives an independent gate line signal from the at least one gate line multiplexer and a second gate line multiplexer mode in which each adjacent pair of the gate lines is provided with a common gate line signal for that pair from the at least one gate line multiplexer.

10. The display defined in claim 1, wherein the data line multiplexer has a plurality of switches each of which is coupled to a respective pair of operational amplifiers of the plurality of operational amplifiers in the column buffer circuitry and each of which is coupled to a respective pair of the data lines.

11. The display defined in claim 1, wherein, in the second resolution mode, all of the plurality of operational amplifiers is enabled.

12. The display defined in claim 1, wherein the first signal is different than the second signal and the first resolution mode is different than the second resolution mode.

13. A display, comprising:

an array of pixels having rows and columns;

a plurality of gate lines that is configured to provide gate signals to the rows;

a plurality of data lines that is configured to provide data signals to the columns;

gate line driver circuitry configured to supply the gate signals to the plurality of gate lines; and data line driver circuitry configured to supply the data signals to the plurality of data lines, wherein the data line driver circuitry comprises:

column buffer circuitry; and a data line multiplexer that is configured to provide the data signals from the column buffer circuitry to the data lines, wherein the data line multiplexer comprises a plurality of switches that selectively shorts adjacent data lines in the plurality of data lines in a first resolution mode and isolates the adjacent data lines in the plurality of data lines in a second resolution mode.

14. The display defined in claim 13, wherein selectively shorting adjacent data lines in the plurality of data lines comprises providing the same data line signals to the adjacent data lines in the plurality of data lines.

15. The display defined in claim 13, wherein the column buffer circuitry has a plurality of operational amplifiers, and wherein a subset of the plurality of operational amplifiers is selectively disabled when the plurality of switches selectively shorts the adjacent data lines in the plurality of data lines.

* * * * *